(12) United States Patent
Beau

(10) Patent No.: US 9,044,890 B2
(45) Date of Patent: Jun. 2, 2015

(54) METHOD FOR MAKING A PART COMPRISING A FOAM LAYER BORNE BY A SUPPORT

(75) Inventor: Godefroy Beau, La Garenne Colombes (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 513 days.

(21) Appl. No.: 12/065,344

(22) PCT Filed: Jul. 28, 2006

(86) PCT No.: PCT/FR2006/001849
§ 371 (c)(1),
(2), (4) Date: Feb. 29, 2008

(87) PCT Pub. No.: WO2007/012769
PCT Pub. Date: Feb. 1, 2007

(65) Prior Publication Data
US 2009/0148663 A1    Jun. 11, 2009

(30) Foreign Application Priority Data

Jul. 29, 2005 (FR) .................................... 05 08153
Mar. 14, 2006 (FR) .................................... 06 02219

(51) Int. Cl.
*B29C 44/04* (2006.01)
*B29C 44/58* (2006.01)
(Continued)

(52) U.S. Cl.
CPC ....... *B29C 44/586* (2013.01); *Y10T 428/24355* (2015.01); *B29C 44/0461* (2013.01); *B29C 44/1285* (2013.01); *B29C 44/5645* (2013.01);
(Continued)

(58) Field of Classification Search
USPC .......... 264/45.1, 46.2, 46.5, 47.8, 645, 297.2, 264/328.1, 41, 42, 43, 44, 45.4, 45.6, 46.4, 264/46.8, 48, 51, 33–35, 45.2, 510, 511, 264/240, 241
See application file for complete search history.

(56) References Cited

U.S. PATENT DOCUMENTS 5,034,076 A * 7/1991 Masui et al. .................... 156/79
5,281,376 A * 1/1994 Hara et al. ................... 264/46.4
(Continued)

FOREIGN PATENT DOCUMENTS

JP       06-320571       * 11/1994
JP       06-320571 A    11/1994
(Continued)

OTHER PUBLICATIONS

International Search Report of PCT/FR2006/001849 dated Nov. 16, 2006.

*Primary Examiner* — Stella Yi
(74) *Attorney, Agent, or Firm* — Young & Thompson

(57) ABSTRACT

The invention concerns the manufacture of a part comprising a foam layer borne by a support. The invention concerns a manufacturing method including providing a foam layer (18) on a surface of a mold part (10), while the mold is open, closing the mold so that it defines a cavity between the foam layer (18) and another mold part (14), and injecting into the cavity a non-cellular plastic material designed to form the support (20). The method includes, after injecting the plastic material of the support (20), a step of gradually spacing apart at a predetermined speed the two parts of the mold (10, 14), in a direction having a component in the direction of the thickness of the foam layer (18). The invention is applicable to motor vehicle interior trims.

15 Claims, 2 Drawing Sheets

(51) Int. Cl.
  *B29C 44/12* (2006.01)
  *B29C 44/56* (2006.01)
  *B29C 45/14* (2006.01)
  *B29C 45/56* (2006.01)
  *B32B 5/18* (2006.01)
  *B29K 23/00* (2006.01)
  *B29K 27/06* (2006.01)

(52) U.S. Cl.
  CPC ........... *B29C 45/14795* (2013.01); *B29C 45/56* (2013.01); *B29C 2045/563* (2013.01); *B29K 2023/06* (2013.01); *B29K 2023/12* (2013.01); *B29K 2027/06* (2013.01); *B32B 5/18* (2013.01)

(56) References Cited

U.S. PATENT DOCUMENTS 6,146,564 A * 11/2000 Beckmann .................. 264/46.5
2003/0067100 A1    4/2003 Kato et al.

FOREIGN PATENT DOCUMENTS

| JP | 06-328481 A | 11/1994 |
| JP | 07-088878 | * 4/1995 |
| JP | 10-235676 A | 9/1998 |

\* cited by examiner

METHOD FOR MAKING A PART COMPRISING A FOAM LAYER BORNE BY A SUPPORT

This invention relates to a process for the production of a part that comprises a thermoplastic foam layer that is supported by a substrate, as well as the part that is obtained.

Although the invention applies to the production of parts that have a relatively rigid substrate and a thermoplastic foam layer that is arranged on the substrate, such a part generally comprises an additional layer on the face of the foam that is opposite to the one that is in contact with the substrate, whereby this additional layer has elastomer properties. Whether such an outside layer is present or not, the foam layer is designed to provide damping properties that depend on the flexibility of the foam layer and therefore various properties such as its porosity.

It is already known, according to the document U.S. Pat. No. 6,576,332, to produce such parts by a process in which a skin is placed against a first mold part, a substrate is placed against another mold part, and a material that is capable of forming a foam is injected between the skin and the substrate. After or during this injection, the two mold parts are separated relative to one another so that the intermediate layer forms a foam. This separation stage is sometimes delayed so that the injected material has undergone a partial cooling. The stage for injecting the material that is designed to form the foam can also be produced when the mold parts are gradually separated, and the formation of the foam is obtained by continuing this separation. In these known processes, the foam is formed after the substrate is produced.

According to the documents JP 06320571, JP 10235676 and JP 06328481, there is already knowledge of processes of a first type that are designed for the production of parts that comprise a thermoplastic foam layer that is supported by a substrate, whereby the process comprises the arrangement of a sheet of a thermoplastic foam layer precursor on a surface of a mold part (10, 30), while the mold is open, closing the mold so that it defines a cavity between the foam layer precursor and another mold part, and the injection into the cavity of a non-cellular plastic material that is designed to form the substrate, which is warm enough to bring about the formation of foam starting from the precursor, whereby the two mold parts are gradually separated at a predetermined speed, in a direction that has a component in the direction of the thickness of the precursor.

It is also known to produce such parts in a process of a second type in several operations. In a first operation, a foam layer or a skin-foam complex is produced at a first station, then the foam layer or the complex is arranged on a first mold part, the mold is closed, and the plastic material that is designed to form the substrate is injected into a cavity that is left between the foam layer or the complex and the other mold part. This process has a drawback because the non-cellular plastic material of the substrate is injected against the foam layer or the complex that is therefore subjected to the injection pressure of the plastic material of the substrate. In such a process, the foam layer or the complex always has a certain degree of flattening. It is not rare that the thickness of the foam is divided in two. It is understood that the foam layer that is ultimately obtained has flexibility and damping properties that are less favorable than those that would be obtained without applying the injection pressure of the substrate.

For the production of parts that have damping properties that are determined by this process of the second type, it is therefore necessary to use, initially, a foam layer or a complex corresponding to properties of damping that are much more significant than the desired properties require, so that, after the application of the injection pressure of the substrate in the mold, the foam layer that is obtained has the desired damping properties. The development of such techniques is very difficult and requires new studies with each change of shape or material.

The invention has as its object to eliminate the drawback of the above-mentioned process of the second type by combination with that with characteristics of the process of the first type. This combination of known means provides an unexpected result, different from the results that are obtained by each of the two above-mentioned processes.

More specifically, in the processes of the first above-mentioned type, the foam layer may have virtually constant properties in its entire thickness. In the second process, because of the injection of the hot non-cellular thermoplastic material against a face of the foam layer or the complex, each face has a tendency to undergo a greater heating and to create a porosity gradient such that the porosity is smallest on the side of the substrate. According to the invention, in a process of this second type, an additional stage for separating two mold parts is added during or, preferably, after the injection of the non-cellular plastic material of the substrate. In this stage, a foam layer or a complex can regain volume by expansion that is virtually or essentially mechanical and optionally by partially chemical expansion. It is noted that the process provides parts that have a porosity that is largest on the side of the substrate.

More specifically, the invention relates to a process for the production of a part that comprises a thermoplastic foam layer that is supported by a substrate, of the type that comprises the arrangement of a complex with a thermoplastic foam layer on a surface of a mold part, while the mold is open, closing the mold so that it defines a cavity between the complex with a foam layer and another mold part, and the injection into the cavity of a non-cellular plastic material that is designed to form the substrate. According to the invention, the process comprises, after the end of the injection of the plastic material that is designed to form the substrate, a stage whereby the two mold parts are gradually separated at a predetermined speed in a direction that has a component in the direction of the thickness of the complex with a foam layer, with preservation of the sealing of the molding cavity.

In one embodiment, the complex with a foam layer is a single foam layer that for all practical purposes undergoes only physical modifications during the separation stage.

In another embodiment, the complex with a foam layer comprises a non-cellular surface layer and a foam layer that for all practical purposes undergo only physical modifications during the separation stage.

Preferably, the gradual separation stage is executed over a distance such that, in the finished part, the foam layer has a thickness of between 0.5 and 1.5 times the thickness of the foam in the free state before the mold is closed and advantageously such that, in the finished part, the foam layer has a thickness that does not differ by more than 10% from the thickness of the foam in the free state before the mold is closed.

In another embodiment, the process comprises, before the mold is closed, the preheating of the complex with a foam layer.

Preferably, the process also comprises a standby stage between the end of the stage where the non-cellular plastic material is injected and the gradual separation stage.

Preferably, the two mold parts are gradually separated at a speed of between 0.1 and 10 mm/s.

Preferably, the injection temperature of the non-cellular plastic material that is designed to form the substrate is adjusted to a value that is higher than the temperature of the complex with a foam layer in the mold, so that the foam layer of the complex has a temperature gradient during the process and has an essentially mechanical expansion that has a gradient and is greater close to the injected plastic material.

In one variant, the foam layer of the complex with a foam layer contains a residual amount of pore-forming material.

The invention also relates to a damping part that is produced by a process according to the invention that has a complex with a foam layer that is arranged on an essentially rigid substrate and such that the foam layer of the complex is a flexible thermoplastic layer that has undergone an essentially mechanical expansion and has a porosity gradient between the face that is adjacent to the substrate and the opposite face, and the gradient is such that the porosity decreases from the face that is adjacent to the substrate toward the opposite face.

Preferably, the porosity variation corresponds to a variation of the size of the pores.

Preferably, the thermoplastic material of the foam is selected from among the polyolefins and the polyvinyl chloride, in particular polyethylene.

Preferably, the thermoplastic foam layer has a thickness of less than 23 mm.

Preferably, the foam also comprises a surface layer, of the side that is opposite to the substrate, and the surface layer advantageously has elastomer properties.

Preferably, the surface layer has a grain.

Preferably, the non-cellular plastic material of the substrate and the thermoplastic material of the foam layer have the same chemical nature.

Other characteristics and advantages of the invention will be better understood from reading the following description, given with reference to the accompanying drawing, in which:

FIGS. 1 to 3 are very diagrammatic views that illustrate the principle of the process according to the invention, in a very exaggerated form, in the case where the complex with a foam layer is a single foam layer.

Figure 1:
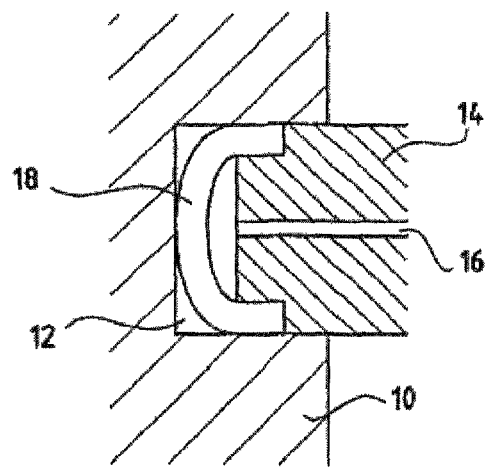
FIG. 1 is a diagrammatic sectional drawing that illustrates a stage of the process in which a mold is closed, but a non-cellular plastic material has not yet been injected.

The mold that is used essentially comprises a matrix 10 that has a cavity 12, and a die 14 that has an injection channel 16. A foam layer 18 with its normal expanded shape has been shown.

The state that is shown in FIG. 1 is obtained by separating the two mold parts 10, 14 by installing foam 18, then by introducing the die 14 in a position that is marked inside the matrix 10.

Figure 2:
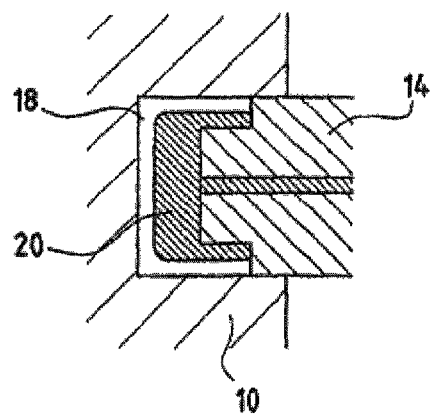
FIG. 2 is a diagrammatic sectional drawing that corresponds to FIG. 1, but in which a non-cellular plastic material that is designed to form the substrate has been injected.

FIG. 2 illustrates the injection stage of the non-cellular plastic material that is designed to form a substrate 20. The injected plastic material exerts a pressure that decreases the thickness of the foam 18. In the state shown in FIG. 2, the injection has just been interrupted, and the foam 18 has been compressed by the injection of the non-cellular material so that its thickness is much decreased.

Figure 3:
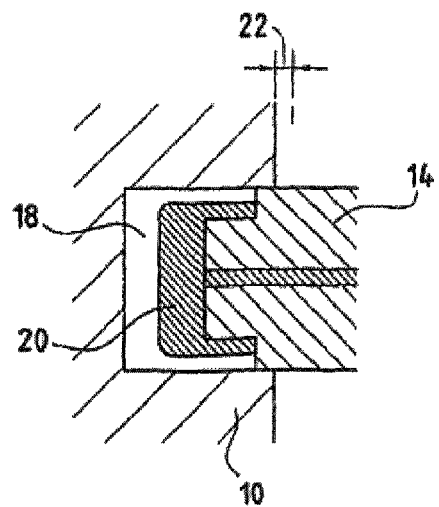
FIG. 3 illustrates the next stage of the process in which the two mold parts have been separated, in a stage that brings about a characteristic modification of the physical properties of the foam layer, according to the invention.

FIG. 3 illustrates the essential stage of the process of the invention. The porosity of the foam 18 and therefore its damping properties have been reduced in the stage of FIG. 2, relative to the foam that is introduced into the cavity of the matrix 10. In the stage that is illustrated by FIG. 3, the matrix 10 is separated from the die 14 (or vice versa) by a distance that is marked by the reference 22, preferably when the injection of the non-cellular material is completed and when this material has changed to an at least partially solidified state.

This separation brings about an increased thickness of the foam layer 18 in the direction of separation, i.e., horizontally in FIG. 3. According to the invention, the separation distance is selected so that the foam layer assumes a final thickness of between 0.5 and 1.5 times its initial thickness and preferably between 0.9 times and 1 times its initial thickness illustrated by FIG. 1.

When the non-cellular plastic material is introduced for the formation of the substrate 20, the injected material is hot and transfers heat to the foam 18, preferably in the proximity of the injected material. It therefore creates a temperature gradient in the foam. Consequently, when the foam undergoes the expansion that is due to the separation of the two mold parts illustrated in FIG. 3, the hottest foam part has a tendency to exhibit a larger expansion than the less hot part. Consequently, the foam part that is closest to the substrate 20 has a larger expansion and therefore a larger porosity than the foam part that is distant from this substrate. These modifications during the separation stage are essentially physical (variation of porosity).

In the conventional process in which the cooling is carried out from the state shown in FIG. 2, the closest part of the plastic material of the substrate 20 has undergone the greatest heating and, as it does not have the opportunity to then expand, it has the most significant compression and therefore the largest reduction of porosity. Consequently, in the molded part that is obtained after the stage of FIG. 2, the porosity gradient of the foam layer 18 is such that the porosity increases from the substrate to the surface opposite to the substrate. On the contrary, during the implementation of the process of the invention, this effect is at least offset, and, most often, more than offset, i.e., reversed, so that the part that is obtained has a porosity gradient such that the porosity is largest close to the substrate 20.

Since the foam layer 18 adopted a thickness similar to the one that it had at the beginning, its damping properties are similar. It therefore is not necessary to determine empirically, for each part shape, what type of foam it is necessary to use initially to obtain the desired final properties. According to the invention, the final properties that are obtained with a foam layer are, for practical purposes, those that it is possible to anticipate from the use of the initial foam.

In FIGS. 1 to 3, in a diagrammatic and exaggerated form, the principle of the invention in the case of a foam with virtually physical expansion is shown. Marginal foam parts that undergo a compression during the injection of the plastic material of the substrate and that do not undergo expansion during the separation of the two mold parts, since the direction of thickness of these foam parts is perpendicular to the separation direction, are thus shown. These parts can be avoided, if necessary, by using a mold of suitable shape. Thus, in general, the molds have relatively refined and complex shapes, and the process of the invention is implemented such that for practical purposes, the foam adopts its original properties in the regions in which these properties are the most significant.

Figure 4:
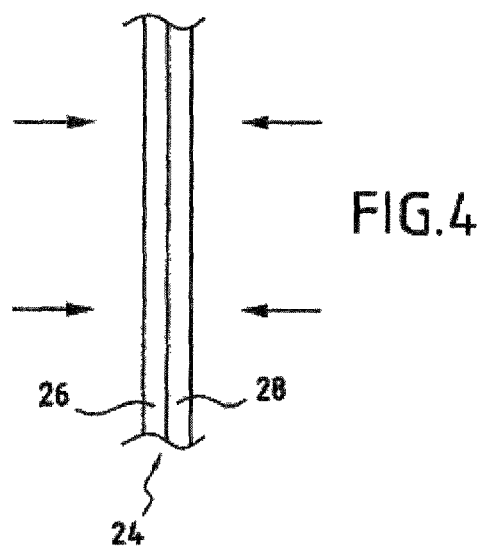
FIG. 4 illustrates the preheating of a complex that is used in a process in which a surface layer undergoes granulation according to the invention.
Figure 5:
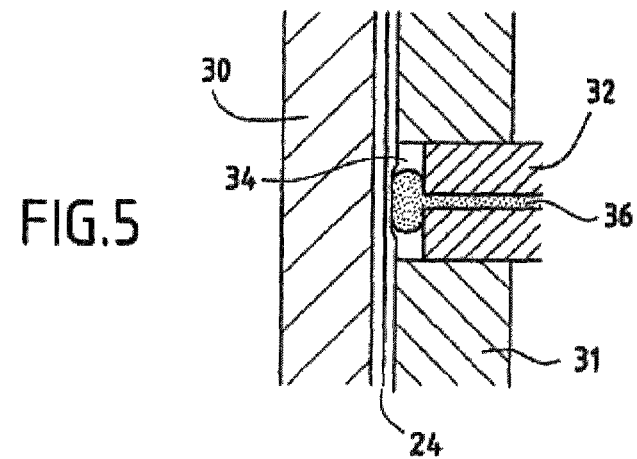
FIG. 5 is a diagrammatic sectional drawing that illustrates a stage in which a non-cellular plastic material begins to be injected into the closed mold.
Figure 6:
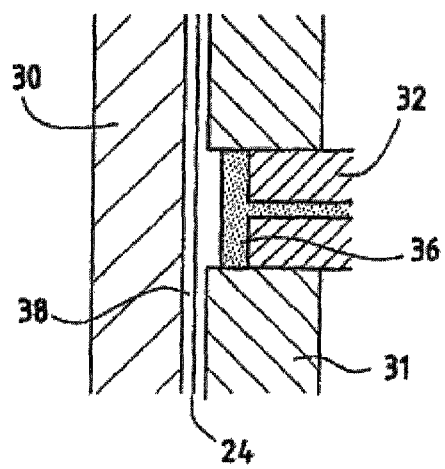
FIG. 6 illustrates the next stage of the process in which the two mold parts are separated, bringing about a characteristic modification of the physical properties of the foam layer, according to the invention.

FIGS. 4 to 6 are very diagrammatic views of stages of the process of the invention; the complex with a foam layer is a skin-foam layer complex.

FIG. 4 shows the composition of a layer 24 of a complex that is formed by a dense surface layer 26, for example a polyolefin skin, and a layer 28 of a foam layer, for example polypropylene. Before introducing the substrate into the injection mold, the layer of the complex is preheated. The temperature may be adequate so that as soon as the mold has been closed and before injection of the substrate, the vacuum application between the dense layer 26 and the adjacent mold surface brings about granulation of the surface of the dense layer.

FIG. 5 shows the arrangement of the various elements when the complex layer has been placed in the mold 30, 31, 32, the latter has been closed to define a cavity 34 for molding of the substrate, and the injection of the plastic material 36 of the substrate has begun. The foam layer 28 has been compressed. However, since the plastic material of the substrate that is injected has a temperature that is higher than that of the foam layer, the latter is heated and reaches a temperature that facilitates the modifications of physical properties.

At the end of the injection of the plastic material of the substrate or shortly thereafter, as FIG. 6 indicates it, the piston 32 of the mold slides into the mold part 31 and is separated from the mold part 30: the foam layer then uses an expansion space. Since the heat is obtained from the injected material, the amount of heat that is received by the foam is greater close to this material, and the foam has a tendency to take on a larger porosity in the proximity of the substrate.

The retraction distance of the piston 32 into the mold part 31 may have any desired value for obtaining the desired thickness of the foam layer.

For the implementation of the process of the invention, it is necessary that the foam that is used be formed by a thermoplastic material, so that it can have the necessary expansion or dilation in the separation phase. It may be polyvinyl chloride, a polyolefin, and in particular polypropylene or polyethylene, which are well suited to this type of process. It is also advantageous that the plastic material of the substrate has a chemical nature that is compatible with that of the foam, and, in an ideal case, consists of the same plastic material.

The separation distance that is marked by the reference 22 corresponds to the foam thickness or to the recovery of thickness that it is desired to provide to the foam.

Other parameters of the process of the invention are the moment at which the separation stage of the two mold parts begins and the separation speed.

It is desirable that the separation stage begins only after the end of the injection of the plastic material of the substrate. In the opposite case, plastic material of the substrate could be introduced in an excessive amount.

In addition, it is desirable that a standby time exists between the end of the injection of the plastic material of the substrate and the beginning of the separation stage so that the heat from the injected plastic material is transmitted to deeper layers of the foam and so that the thickness that is subjected to expansion is greater.

Finally, so that the foam well fills the space that is created by the stage for separating the two mold parts, it may be desirable to use a matrix part that has intake channels, either so that the foam remains well flattened against the surface of the cavity of the matrix part or so that the dense surface layer of the complex undergoes granulation against the surface of the mold.

In this document, the expression "complex with a foam layer" refers to either a single foam layer that has modifications of its physical properties during the process or a complex that comprises a foam layer and a surface layer.

The advantage of the foam layer with a porosity gradient that is obtained by the process according to the invention arises from the fact that it is firmer in the proximity of the outside surface than of the side of the substrate. It is then possible to obtain, even without a layer of a specific dense material, a foam layer whose surface is continuous due to its contact with the mold surface but that reacts to touch in a way that is analogous to how skin responds to a homogeneous foam.

According to the invention, the temperature gradient, and therefore the porosity gradient that is obtained, is higher, the lower the thermal conductivity coefficient of the foam. For this reason, the use of a complex with a foam layer provides properties that are different from those of a dense material, for example a solid or liquid dense layer that transmits the heat much better than a cellular material of the same chemical substance.

If the porosity gradient effect that is obtained is inadequate, for example because the nature of the materials of the foam and the substrate imposes an inadequate temperature difference between the foam and the injected material, it is possible to use a complex whose foam layer has not undergone a complete foaming, i.e., also contains a pore-forming material. The porosity gradient that is obtained by virtually purely physical modifications of the foam is then completed by a porosity gradient that is obtained by chemical means. The two gradients reinforce one another.

The invention claimed is:

1. A process for production of a part that comprises a thermoplastic foam layer of foam cells supported by a substrate, the process comprising:

arranging a complex with a foamed thermoplastic foam layer having foam cells in a mold, on a surface of a first mold part, while the mold is open, completely closing the mold so that the completely closed mold defines an enclosed cavity between the complex with a foamed thermoplastic foam layer and a second mold part, injecting into the cavity of the completely closed mold a non-cellular plastic material that is designed to form the substrate, the non-cellular plastic material contacting the foamed thermoplastic foam layer, compressing the foamed thermoplastic foam layer and decreasing a thickness of the foamed thermoplastic foam layer, wherein the non-cellular plastic material has been heated to a temperature that is higher than a temperature of the foamed thermoplastic foam layer arranged in the mold, the injected non-cellular plastic material thereby heating the foamed thermoplastic foam layer so that the foamed thermoplastic foam layer has a temperature gradient with the temperature of the foamed thermoplastic foam layer being greater close to the injected non-cellular plastic material, and gradually separating the first mold part and the second mold part at a speed of between 0.1 and 10 mm/s in a direction of a thickness of the complex with a foamed thermoplastic foam layer, the gradually separating allowing the compressed foamed thermoplastic foam layer to expand, increasing the thickness of the foamed thermoplastic foam layer and creating a porosity gradient in the foamed thermoplastic foam layer, wherein the porosity gradient of the foamed thermoplastic foam layer is greatest on a side closest to the substrate and decreases in a direction away from the substrate, while preserving sealing of the cavity.

2. The process according to claim 1, wherein the complex with a foamed thermoplastic foam layer is preheated before the mold is completely closed.

3. The process according to claim 1, wherein the foamed thermoplastic foam layer undergoes only physical modifications during the gradually separating, and the first mold part and second mold part are separated over a distance such that in the produced part, the foamed thermoplastic foam layer has a thickness of between 0.5 and 1.5 times an initial thickness of the foamed thermoplastic foam layer before the mold is closed.

4. The process according to claim 1, further comprising a standby step between the injecting and the gradually separating.

5. The process according to claim 1, wherein the foamed thermoplastic foam layer, before arrangement in the mold, contains a residual amount of pore-forming material.

6. The process according to claim 1, wherein the foamed thermoplastic foam layer comprises polyolefin or polyvinyl chloride.

7. The process according to claim 1, wherein the foamed thermoplastic foam layer comprises polypropylene or polyethylene.

8. The process according to claim 1, wherein the foamed thermoplastic foam layer has a thickness of less than 23 mm.

9. The process according to claim 1, wherein the non-cellular plastic material of the substrate and the thermoplastic material of the foamed thermoplastic foam layer are the same plastic material.

10. The process according to claim 1, wherein the foamed thermoplastic foam layer remains against the surface of the first mold part by applying a vacuum to intake channels in the mold between the foamed thermoplastic foam layer and the mold surface.

11. The process according to claim 1, wherein the complex with a foamed thermoplastic foam layer comprises an additional non-cellular plastic layer on a surface of the foamed thermoplastic foam layer opposite to a surface in contact with the substrate.

12. The process according to claim 11, wherein said non-cellular plastic layer has a grain pattern.

13. The process according to claim 1, wherein the first mold part and second mold part are separated over a distance such that in the produced part, the foamed thermoplastic foam layer has a thickness of between 0.9 and 1 times an initial thickness of the foamed thermoplastic foam layer before the mold is closed.

14. The process according to claim 1, comprising:
pre-heating a complex having a polyolefin layer and a foamed polypropylene foam layer;
arranging the complex in the mold with the polyolefin layer positioned toward the surface of the first mold part, the surface of the first mold part having a granulation pattern, and completely closing the mold;
applying a vacuum to the mold, thus holding the polyolefin layer against the surface of the first mold part, and transferring the granulation pattern to the pre-heated polyolefin layer; and
injecting the non-cellular plastic material into the enclosed cavity.

15. A process for production of a part that comprises a foamed thermoplastic foam layer of foam cells supported by a substrate, the process comprising:
positioning a complex with a foamed thermoplastic foam layer having foam cells in a molding cavity of a first mold part, the molding cavity configured to receive a second mold part;
inserting the second mold part into the molding cavity so that the foamed thermoplastic foam layer positioned in the molding cavity of the first mold part is between the first mold part and second mold part;
injecting a non-cellular plastic material between the second mold part and the foamed thermoplastic foam layer so that the injected non-cellular plastic material exerts a pressure on the foamed thermoplastic foam layer to compress the foamed thermoplastic foam layer against the molding cavity of the first mold part to reduce a thickness of the foamed thermoplastic foam layer, the injected non-cellular plastic material forming a substrate for supporting the foamed thermoplastic foam layer, wherein the non-cellular plastic material has been heated to a temperature that is higher than a temperature of the foamed thermoplastic foam layer positioned in the molding cavity of the first mold part, the injected non-cellular plastic material thereby heating the foamed thermoplastic foam layer so that the foamed thermoplastic foam layer has a temperature gradient with the temperature of the foamed thermoplastic foam layer being greater close to the injected non-cellular plastic material, and
gradually separating the second mold part and the first mold part at speed of between 0.1 and 10 mm/s in a direction of a thickness of the foamed thermoplastic foam layer so that the compressed foamed thermoplastic foam layer expands and increases in thickness to create a porosity gradient in the foamed thermoplastic foam layer, wherein during the gradual separation the compressed foamed thermoplastic foam layer expands and the thickness increases while foamed thermoplastic foam layer and substrate remain within molding cavity and between the first mold part and second mold part, and the porosity gradient of the foamed thermoplastic foam layer is greatest on a side closest to the substrate and decreases in a direction away from the substrate.

* * * * *